United States Patent

[11] 3,604,730

[72] Inventors Charles J. Carroll
McKeesport;
Stephen Shufran, North Versailles, both of, Pa.
[21] Appl. No. 828,932
[22] Filed May 29, 1969
[45] Patented Sept. 14, 1971
[73] Assignee United States Steel Corporation

[54] MAKE-AND-BREAK CONNECTION
1 Claim, 6 Drawing Figs.

[52] U.S. Cl. ............................................. 285/27,
285/375
[51] Int. Cl. ............................................. F16l 35/00
[50] Field of Search ............................... 285/18, 24, 27, 375

[56] References Cited
UNITED STATES PATENTS

| | | | |
|---|---|---|---|
| 1,874,918 | 8/1932 | Davis | 285/375 X |
| 3,107,107 | 10/1963 | Gaurnaschelli | 285/375 X |
| 3,227,475 | 1/1966 | Sinkinson | 285/375 X |
| 458,349 | 8/1891 | Greene | 285/24 |
| 1,383,306 | 7/1921 | Jacques | 285/375 X |
| 1,415,157 | 5/1922 | Courchene | 285/375 X |
| 1,474,270 | 11/1923 | Lewis | 285/375 X |
| 3,448,760 | 6/1969 | Cranage | 285/18 X |

FOREIGN PATENTS 1,347,032  12/1963  France ..................... 285/27

*Primary Examiner*—Dave W. Arola
*Attorney*—Donald S. Ferito

ABSTRACT: The apparatus described is a make-and-break joint connection for a conduit of a pressure-fluid-supply line. The apparatus includes a relatively fixed tubular socket having a tubular plunger reciprocable therein and protruding from one end thereof. A flexible fluid-supply conduit is connected with the plunger and communicates with a fluid passageway extending longitudinally through the plunger. Spring means are disposed within the socket to provide a floating mounting for the plunger so that it is capable of being tilted angularly and moved horizontally relative to the socket. The apparatus further includes a cup movable toward and from the protruding end of the plunger for telescoping engagement therewith. A fluid tube is provided through the bottom of the cup for connection with a fluid conduit leading to an operating pressure cylinder A coupling on the protruding end of the plunger is adapted to engage a coupling on the inner end of the fluid tube in the cup to create an unobstructed fluid passageway between the two conduits when the cup is telescoped onto the protruding end of the plunger. The apparatus is particularly suitable where it is desired to utilize a make-and-break connection which is self-aligning and speedy in operation.

INVENTORS.
CHARLES J. CARROLL &
STEPHEN SHUFRAN
By Donald S. Ferito
Attorney

MAKE-AND-BREAK CONNECTION

BACKGROUND OF THE INVENTION

The present invention relates generally to material-handling equipment and, more particularly, to an improved make-and-break connection for the pressure-fluid-supply line of an equipment-operating system.

In the manufacture of electric welded steel pipe, a considerable amount of flux material remains in the pipe as it moves out of the electric welding unit and this flux must be removed before the pipe can be processed further. Originally the flux material was removed by applying a vacuum to the pipe. However, this method did not prove fast nor efficient enough in high-speed pipe welding lines. The vacuum system was replaced with a tilting mechanism whereby the terminal portion of the pipe conveyor was tilted to upend the pipe after welding and allow the flux to flow out by gravity. Although the latter method proved compatible with high-speed pipe welding lines it was not completely free from fault. This fault evolved from the fact that pressure-cylinder-operated kickout devices were necessarily mounted on the terminal section of the conveyor for the purpose of transferring welded pipe laterally from the conveyor. A danger existed that the kickout devices could be inadvertently actuated when the conveyor section was in tilted position. This would cause the pipe to be thrown off of the uptilted conveyor section to the floor of the mill or onto other equipment with consequent hazard to personnel in the area.

It is, accordingly, the primary object of the present invention to eliminate the inherent danger described above by providing a unique make-and-break connection in the pressure-fluid-supply conduit leading to the kickout operating cylinders of a pipe conveyor which would positively break off the flow of pressure fluid to the operating cylinders when the conveyor was in tilted position.

As a corollary to the above, it is another object of the invention to provide a make-and-break connection which is positive and fast in operation and rugged in construction.

It is a further object of the invention to provide an improved make-and-break connection as set forth by the foregoing statements of object in which the make-and-break connection is comprised of a relatively movable coupling element attached to the tiltable section of a pipe conveyor and a relatively fixed coupling element mounted adjacent to but separate from the conveyor for engagement by the movable coupling element only when the conveyor section is in nontilted position.

It is another object of our invention to provide an improved make-and-break connection as set forth by the statement of object immediately above wherein the coupling elements are self-aligning.

SUMMARY OF THE INVENTION

The apparatus of the invention comprises a relatively fixed tubular socket having a reciprocable tubular plunger disposed therein in a floating mounting provided by a plurality of compression springs spaced circumferentially around the plunger in the socket. The plunger is provided with a fluid passageway connected with a pressure-fluid-supply line. The plunger protrudes from one end of the socket and is urged outwardly of the one end of the socket by the compression springs which are retained by means of a confining ring which is disposed over the end of the socket and secured thereto. A coupling element communicating with the fluid passageway is disposed on the protruding end of the plunger. A cup is provided adapted to be attached to the tilting portion of a conveyor for movement toward and away from the protruding end of the plunger for telescoping engagement therewith. A fluid tube is disposed through the bottom of the cup and is provided with a coupling on its inner end. The coupling element on the fluid tube is adapted to engage the coupling element on the plunger when the cup is telescoped onto the plunger to provide an unobstructed fluid flow between the fluid-supply line connected with the plunger and the fluid tube.

Figure 1:
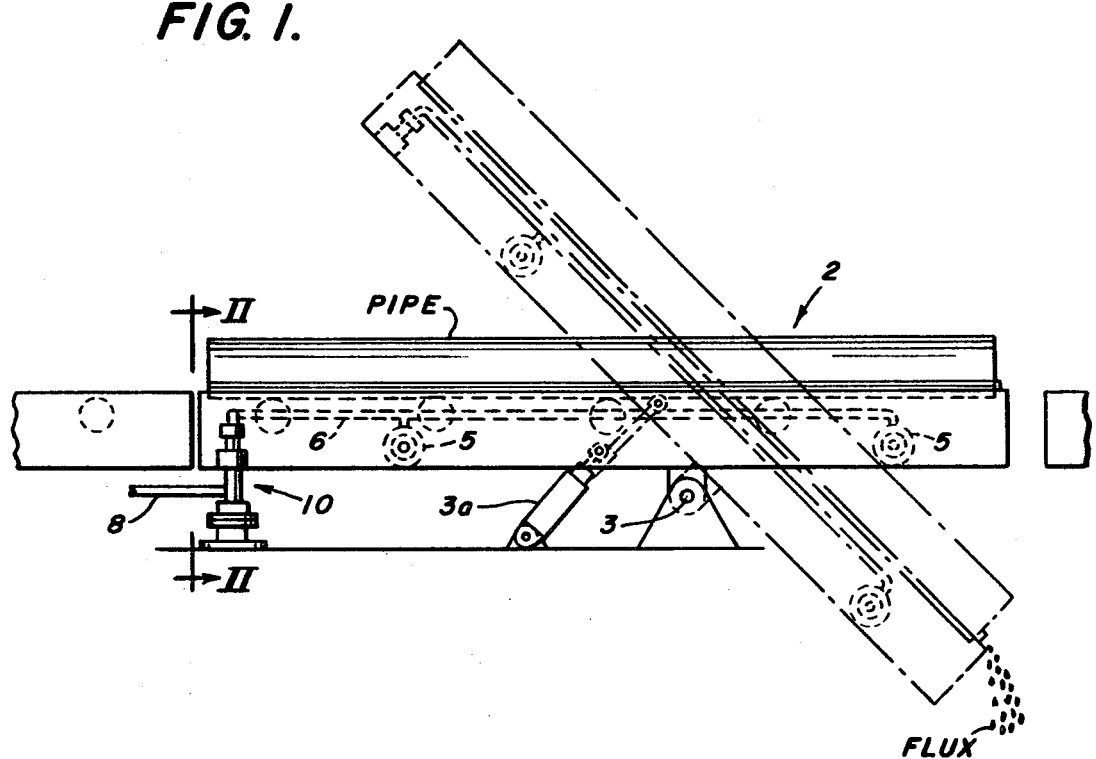
FIG. 1 is a substantially schematic elevational view of a tilting conveyor utilizing the apparatus of the invention.
Figure 2:
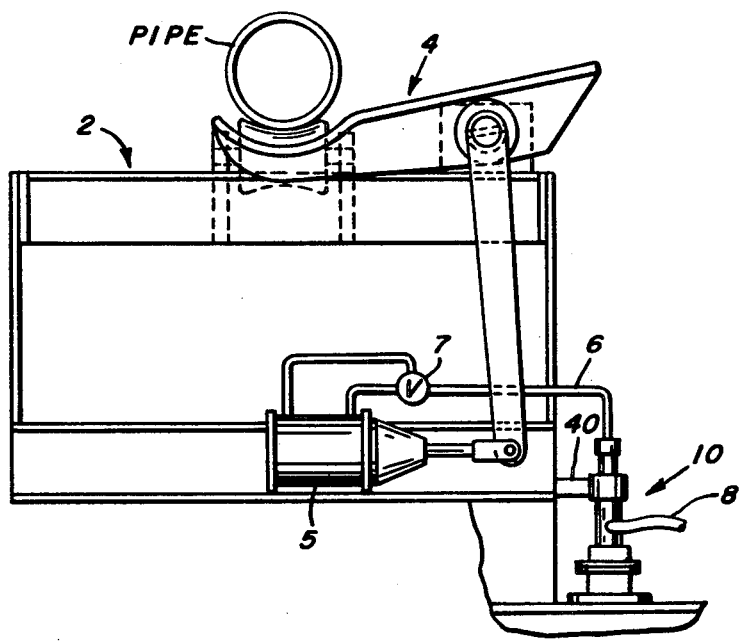
FIG. 2 is a cross-sectional view taken substantially along the line II—II of FIG. 1.
Figure 3:
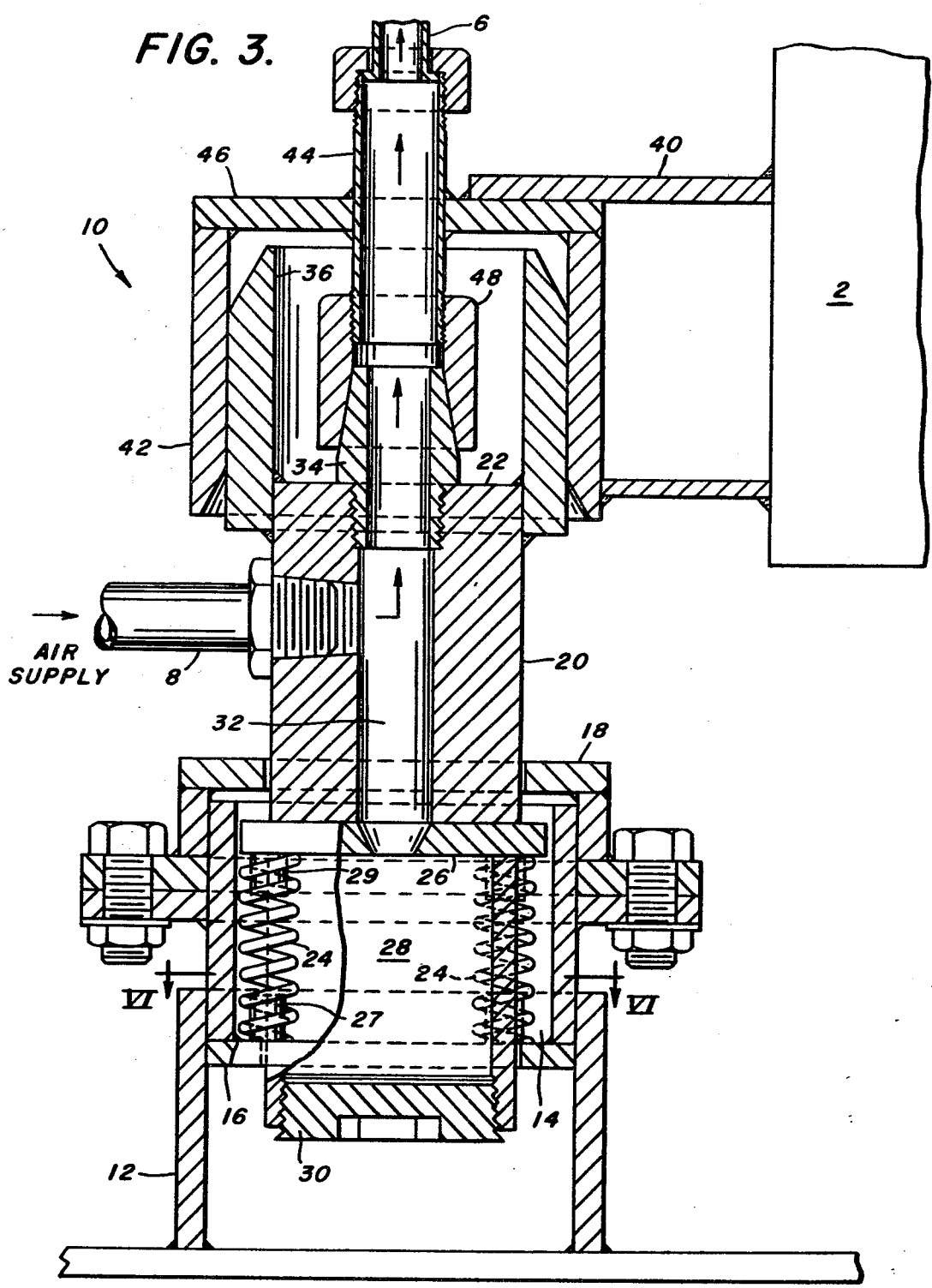
FIG. 3 is a vertical sectional view of the make-and-break connection of the invention in "make" position with parts broken away for clarity.

Referring more particularly to the drawing, reference numeral 2 designates generally a pipe conveyor tiltable about a pivot 3 by a suitable fluid-pressure cylinder 3a. The conveyor 2 is equipped with a pipe kickout device 4 operated by a double-acting pneumatic cylinder 5. The kickout device 4 may be of the type shown and described by U.S. Pat. No. 2,529,837. Air under pressure is supplied to the cylinder 5 by a conduit 6. Air from the conduit is directed to the head end or the piston end of the cylinder 5 by means of a conventional valve 7. Conduit 6 is connected with a flexible air-supply line or conduit 8 by means of the make-and-break connection of the invention, designated generally by reference numeral 10.

The make-and-break connection 10 of the invention includes a fixed tubular socket frame 12 mounted on the mill floor adjacent the conveyor 2. The socket 12 includes an annular chamber 14 having an open bottom surrounded by a lower retaining ring 16 and an open top surrounded by an upper retaining ring 18. A plunger 20 is reciprocably mounted upright in the chamber 14 with one end 22 thereof protruding from the open upper end of the chamber. A floating mounting in the socket frame 12 is provided for the plunger 20 by means of four helical compression springs 24 spaced circumferentially around the lower part of the plunger in the chamber 14. One end of each of the springs 24 bears against the bottom retaining ring 16 of the socket frame 12 while the other end of each of the springs bears against a circumferential flange 26 on the plunger 20. Studs 27 and 29 are provided on the retaining ring 16 and flange 26, respectively, for maintaining the springs 24 fixed in position relative to each other. The springs not only provide a floating mounting for the plunger but also urge it upwardly toward the upper end of the socket frame. The floating mounting permits the plunger 20 to move angularly relative to the socket 12 for a reason which will become apparent. The flange 26 is of greater diameter than the inside diameter of the upper retaining ring 18 so that the latter limits the vertical movement of the plunger relative to the socket.

The portion of the plunger below the flange 26 constitutes a chamber 28 having a plugged bottom opening 30. A vertical air passageway 32 extends axially of the plunger 20 above and in communication with the chamber 28. The upper end of the air passageway 32 has threaded therein a tapered male coupling member 34. A guide housing 36 having a tapered upper edge surrounds the periphery of the projecting end of the plunger 20 spaced from the coupling 34 so as to form a cup with the coupling 34 in its center. Conduit 8 communicates with the fluid passageway 32 and is connected to one side of the plunger 20 below the coupling 34.

A frame 40 fixedly attached to the conveyor 2 projects therefrom and supports a guide housing 42 which is adapted to telescopingly engage the guide housing 36. Similarly to guide housing 36 the free edge of the guide housing 42 is tapered so as to facilitate telescoping engagement between the two guide housings. An air tube 44 projects through the base 46 of the guide housing 42 and is connected with conduit 6. The bottom or inner end of the air tube 44 is externally threaded and has screwed thereon a tapered female coupling 48 which is adapted to enter into sealing engagement with the coupling 34 when the guide housing 42 is telescoped onto the guide housing 36.

In operation, when the conveyor is in normal horizontal position, as shown by solid lines in FIG. 1, the guide housing 42 is in telescopic engagement with the guide housing 36 and the female coupling 48 is in engagement with the male coupling 34 so that an open passageway for air exists between the conduit 8 and the kickout cylinder 5. It will be noted that a valve (not shown) in the conduit 8 is operated to introduce air to the kickout cylinder when desired. When the conveyor is in uptilted position, as shown by broken lines in FIG. 1, the frame support 40, together with the guide housing 42 and the female coupling 48, is lifted with the uptilted end of the conveyor to break the connection between the conduit 6 and the passageway 32 so that the kickout cylinder cannot be inadvertently actuated.

Figure 4:
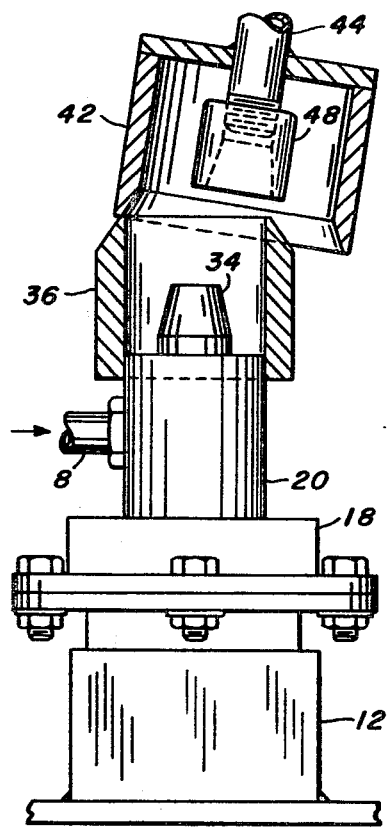
FIG. 4 is a substantially schematic elevational view showing the make-and-break connection of the invention in operation approaching make position.
Figure 5:
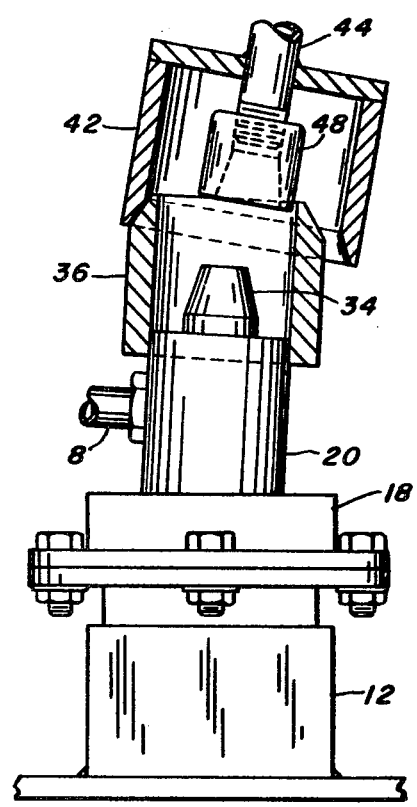
FIG. 5 is a view similar to FIG. 4 but showing the make-and-break connection of the invention in operation in a more advanced state make position.
Figure 6:
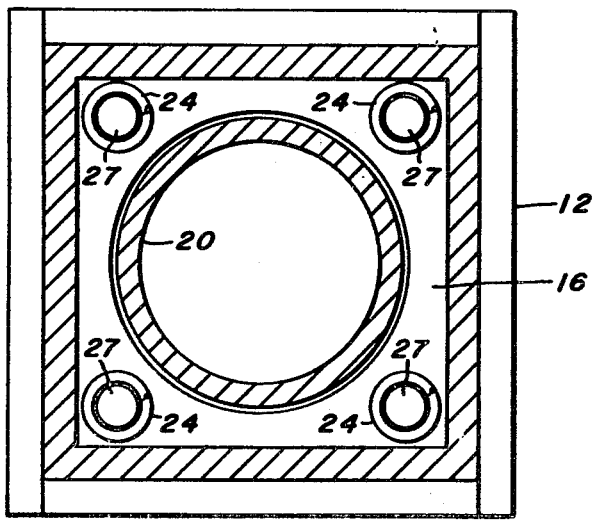
FIG. 6 is a cross-sectional view taken substantially along the line VI—VI of FIG. 3.

It will be seen that the make-and-break connection of the invention is positive in action to effect either the interruption of a supply of air to the kickout cylinder 5 of the conveyor or to effect a free-flowing supply of air under pressure to the cylinder. The "floating mount" arrangement of the plunger 20 within the socket 12 affords sufficient relative angular and horizontal movement between the plunger and the socket so that the components of the make-and-break connection of the invention are automatically aligned as the make position is approached, as best shown in FIGS. 4 and 5.

We claim:

1. A make-and-break joint for a conduit comprising conduit means, a relatively fixed tubular socket, a tubular plunger reciprocable in said socket and protruding from one end thereof, said plunger having a loose fit in said socket permitting limited angular relation therebetween, spring means urging said plunger toward said one end of said socket, a cup movable toward and from the protruding end of said plunger for telescoping engagement therewith, the interior of said cup making a snug fit with the exterior of said protruding end when telescoped therewith, a portion of said conduit means fixed to and projecting inwardly of said cup, a first coupling fitting disposed on the projecting end of said conduit means portion in said cup, a passageway means formed in the protruding end of said plunger, a second coupling fitting disposed on said protruding end of said plunger in communication with said passageway means, and said second coupling fitting adapted to engage said first coupling fitting when said cup is in engagement with the protruding end of said plunger.

UNITED STATES PATENT OFFICE
CERTIFICATE OF CORRECTION

Patent No. 3,604,730            Dated September 14, 1971

Inventor(s) Charles J. Carroll, et al

It is certified that error appears in the above-identified patent and that said Letters Patent are hereby corrected as shown below:

Column 2, line 15, "make" should read -- "make" -- ; line 18, "state" should read -- stage -- ; same line, "make" should read -- "make" -- ; line 26, "2,529,837" should read -- 2,519,837 -- . Column 4, line 4, "make" should read -- "make" -- .

Signed and sealed this 14th day of November 1972.

(SEAL)
Attest:

EDWARD M. FLETCHER, JR.
Attesting Officer

ROBERT GOTTSCHALK
Commissioner of Patents